United States Patent [19]

Flippen, Jr.

[11] 3,869,100

[45] Mar. 4, 1975

[54] RECORDING TAPE DRIVE APPARATUS

[75] Inventor: George Burdine Flippen, Jr., Austin, Tex.

[73] Assignee: International Business Machines Corporation, Armonk, N.Y.

[22] Filed: Sept. 28, 1972

[21] Appl. No.: 293,252

[52] U.S. Cl. .................................................. 242/201

[51] Int. Cl. ........................ G11b 15/28, G11b 15/32

[58] Field of Search ........... 242/201, 202, 204, 205, 242/206, 207, 208, 210, 54.1

[56] References Cited

UNITED STATES PATENTS

| | | | |
|---|---|---|---|
| 2,705,599 | 4/1955 | McCollough | 242/202 |
| 3,559,907 | 2/1971 | Somervell | 242/54.1 |

*Primary Examiner*—George F. Mautz
*Attorney, Agent, or Firm*—James H. Barksdale, Jr.

[57] ABSTRACT

A recording tape drive apparatus for effecting tensioning and bidirectional driving of recording tapes during reading, writing, erasing, and accessing. The apparatus is structured such that identical characteristics of drive and tensioning are obtained for either direction of motion of the tape. The apparatus is made up of a drive motor having a shaft with a capstan on one end. Connected to the motor shaft is a belt which in turn is connected to two multishaft tensioning units which are direction controlled by spring type clutches. The belt is connected to the drive pulley or input shaft of each unit and a tape reel is connected to the output shaft of each unit. The multiple shafts making up each unit are connected, depending on the direction of drive, through drag, pulley, and check clutches. The arrangement of the shafts and clutches is such that the drag clutches provide a drag against the tape regardless of the direction the tape is driven. For rotation of the input shaft of each unit in one direction a check clutch grips, a pulley clutch slips, and a drag clutch imparts drag and tension to a supply reel. When rotated in the other direction, the check clutch slips, the pully clutch grips, and the drag clutch provides a torque limited output from the motor to an output shaft which is connected to a tape reel.

3 Claims, 3 Drawing Figures

RECORDING TAPE DRIVE APPARATUS

CROSS REFERENCE TO RELATED APPLICATION

U.S. Pat. application Ser. No. 268,239, filed July 3, 1972, entitled "Cassette Loading and Unloading Apparatus," having L. K. Childress, Jr. et al as inventors, now U.S. Pat. No. 3,832,734.

BACKGROUND OF THE INVENTION

1. Field of the Invention

This invention relates to tape drives in general, and more specifically to a simple and efficient tape drive apparatus for producing identical characteristics of drive and tensioning regardless of the direction the tape motion.

2. Description of the Prior Art

Heretofore, a number of attempts have been made to develop a simple and efficient tape drive apparatus. These attempts have involved the use of sprag clutches, hysterises clutches, etc., which in their make up are relatively simple. One problem though, is that sprag clutches are excessively expensive. Another problem is that when hysteresis clutches are used, an intermittent torque is supplied rather than a continuous and smooth torque. Yet another problem relates to the compactness of the apparatus. When hysterisis clutches are used, a great deal more space is required than with spring type clutches of the present invention. In order to provide a compact, inexpensive, and efficient apparatus for driving and tensioning a tape, a combination of spring type clutches is used.

SUMMARY OF THE INVENTION

The aforementioned problems are overcome by providing an apparatus having two multishaft drive units with the shafts of each unit connected by spring type clutches. A motor drive shaft is connected by a belt to each multishaft unit which in turn is connected to a take up or supply reel for magnetic recording tapes. For one of the multishaft units when the motor is driven in one direction, a check type spring clutch will grip, a pulley type spring clutch will slip, and a drag type spring clutch will slip, but supply drag to the output shaft of the unit. When the motor is rotated in the other direction, the check clutch will slip, the pulley clutch will grip, and the drag clutch will again slip, but provide a torque limited drive force to the output shaft. Each multishaft unit is comprised of a main shaft and an output shaft with the check clutch connecting the main shaft to the frame. The pulley clutch connects the supply drive wheel to the main shaft, and the drag clutch connects the main shaft to the output shaft. With respect to the motor drive shaft, each multishaft spring clutch arrangement is asymmetrical.

Due to the structural arrangement of the apparatus, the tape has loads applied at three points; the take-up reel, the supply reel, and the capstan and pinch roller. The supply reel load is provided by the drag clutch. The capstan - pinch roller load is the dominate driving force in the system. The third load applied to the tape is for taking up the tape that is fed through the capstan - pinch roller area.

When the direction of tape motion is reversed by changing the direction of rotation of the motor and thus the capstan rotation, only the capstan - pinch roller load changes direction. The capstan - pinch roller load changes direction while the torques applied to the two reels remain the same magnitude and direction.

DESCRIPTION OF THE PREFERRED EMBODIMENT

Figure 1:
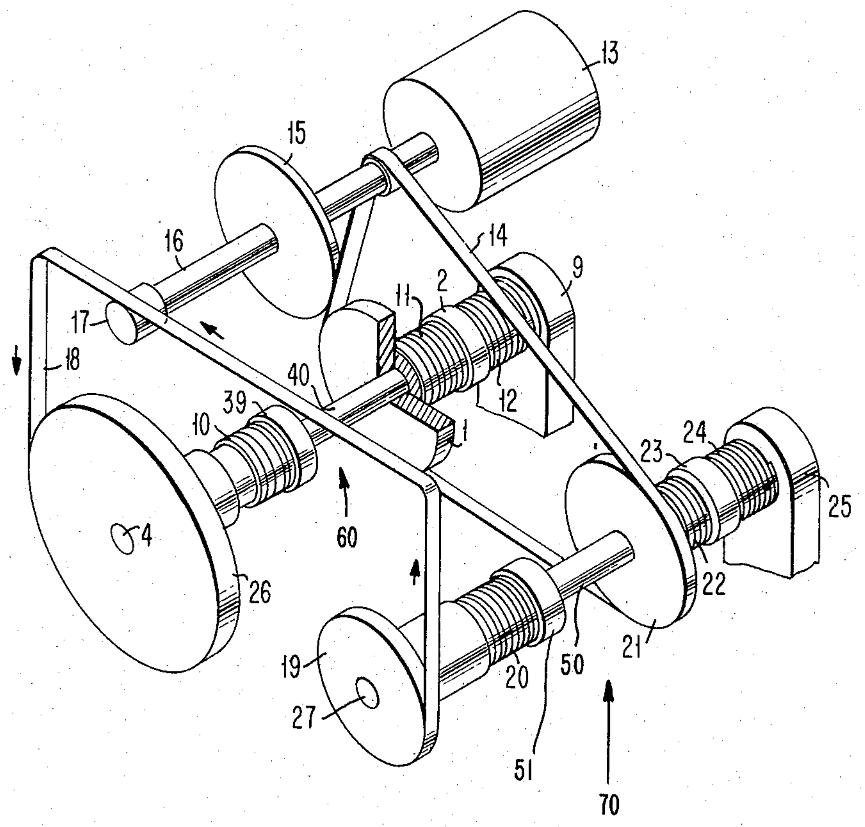
FIG. 1 is a perspective view illustrating the apparatus of this invention and showing both multishaft drive and tensioning units connected through a belt to a reversible motor.

For a more detailed description of the invention, reference is first made to FIG. 1 wherein there is shown the overall apparatus for driving and tensioning a magnetic recording tape. A reversible DC motor 13 is connected to drive pulleys 1 and 21 through a flexible belt 14. When motor 13 is rotated in a clockwise direction as viewed from the back of motor 13, tape 18 will be wound on take up reel 26. Motor 13 has shaft 16 which in turn has an emitter wheel 15 and capstan 17. Emitter wheel 15 is used for velocity control and accessing purposes, and capstan 17 is used in conjunction with other apparatus (not shown) such as a pinch roller for driving the tape at a determined velocity.

The multishaft units for driving and tensioning tape 18 are generally designated by reference numerals 60 and 70. Each is made up of check clutch springs 12 and 24, hubs 2 and 23, pulley clutch springs 11 and 22, main shafts 40 and 50, hubs 39 and 51, drag clutch springs 10 and 20, and output shafts 4 and 27. Output shafts 4 and 27 are connected, respectively, to take up reel 26 and supply reel 19. Supports 9 and 25 support each mutlishaft unit and are connected to the remainder of the apparatus frame (not shown).

As will become more readily apparent from the remainder of the specification, each of the clutches forming part of the apparatus are made up of springs and associated arbors.

Figure 2:
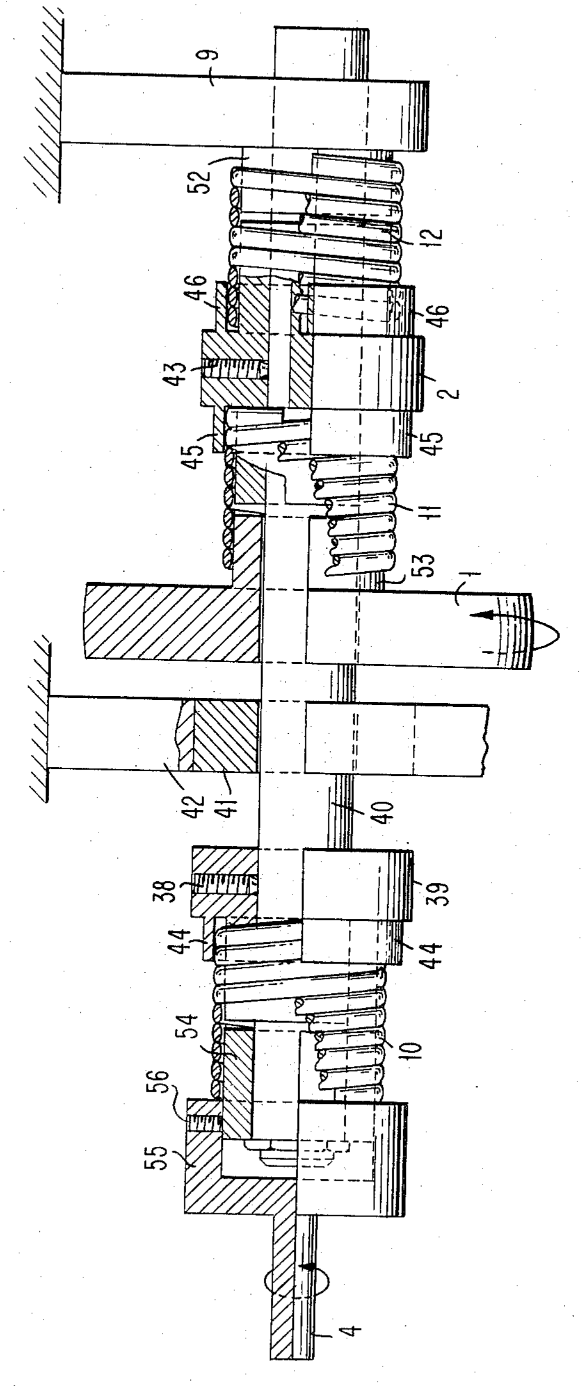
FIG. 2 is a sectional view of a multishaft drive unit illustrating the apparatus frame, the spring type clutches, the main shaft, the drive pulley, and the output shaft.

Refer next to FIG. 2. In FIG. 2 there is shown a multishaft unit which can, for purposes of explanation, correspond to unit 60 in FIG. 1. When pulley 1 is rotated in a clockwise direction as viewed from the end of shaft 40 having support 9 and integral arbor 52, check clutch spring 12 will slip on arbor 52. Check clutch spring 12 is rigidly affixed to hub 2 by clip 46. Hub 2 is secured to main shaft 40 by locking screw 43. Also, when pulley 1 is driven in a clockwise direction through belt 14 (FIG. 1), pulley clutch spring 11 will grip arbor 53 which is integral with pulley 1, causing rotation of shaft 40. Shaft 40 is now connected to pulley 1 through spring 11 and hub 2. Pulley clutch spring 11 is fixedly secured to hub 2 by clip 45. Shaft 40 is supported and aligned by bushing 41 in portion 42 of the apparatus frame.

Again, for clockwise rotation of pulley 1, drag clutch spring 10 will slip, but drag against arbor 54 which is fixed to hub 55 through set screw 56. Hub 55 is an integral portion of output shaft 4. Also, hub 39 is fixedly secured to shaft 40 by set screw 38, and drag clutch spring 10 is fixedly secured to hub 39 by clip 44.

As can be determined from the above, clockwise rotation of pulley 1 by motor 13 will result in clockwise rotation of output shaft 4 and torque limited driving of take-up reel 26 (FIG. 1).

For rotation in the counter-clockwise direction, take up reel 26 will become a supply reel requiring a supplied drag to maintain tape tension. When pulley 1 is rotated in a counter-clockwise direction, check clutch spring 12 will grip, pulley clutch spring 11 will slip, and arbor 54 will slip against drag clutch spring 10, providing a drag on output shaft 4.

While each of the clutches 10, 11, and 12 are of the one-way spring type, the arrangement of the multishaft units is such that the drag clutch spring 10 is always operating in the slip or overriding mode for either direction of rotation of drive pulley 1.

The following table will 1) illustrate the structure of the clutch springs in terms of left or right hand turns, 2) the direction of rotation of the drive pulleys for each multishaft unit, and 3) the action of the clutch springs in terms of gripping and slipping as related to the direction the drive pulleys are rotated. These tables are related to FIGS. 1 and 2 and can be more fully appreciated when reference is made primarily to FIG. 1.

MULTISHAFT UNIT 60

| Direction of Pulley Rotation as viewed from support end | Check Clutch Left Hand Spring | Pulley Clutch Right Hand Spring | Drag Clutch Right Hand Spring |
|---|---|---|---|
| clockwise | slip | grip | slip (drag) |
| counter-clockwise | grip | slip | slip (drag) |

MULTISHAFT UNIT 70

| Direction of Pulley Rotation as viewed from support end | Check Clutch Right Hand Spring | Pulley Clutch Left Hand Spring | Drag Clutch Left Hand Spring |
|---|---|---|---|
| clockwise | grip | slip | slip (drag) |
| counter-clockwise | slip | grip | slip (drag) |

Figure 3:
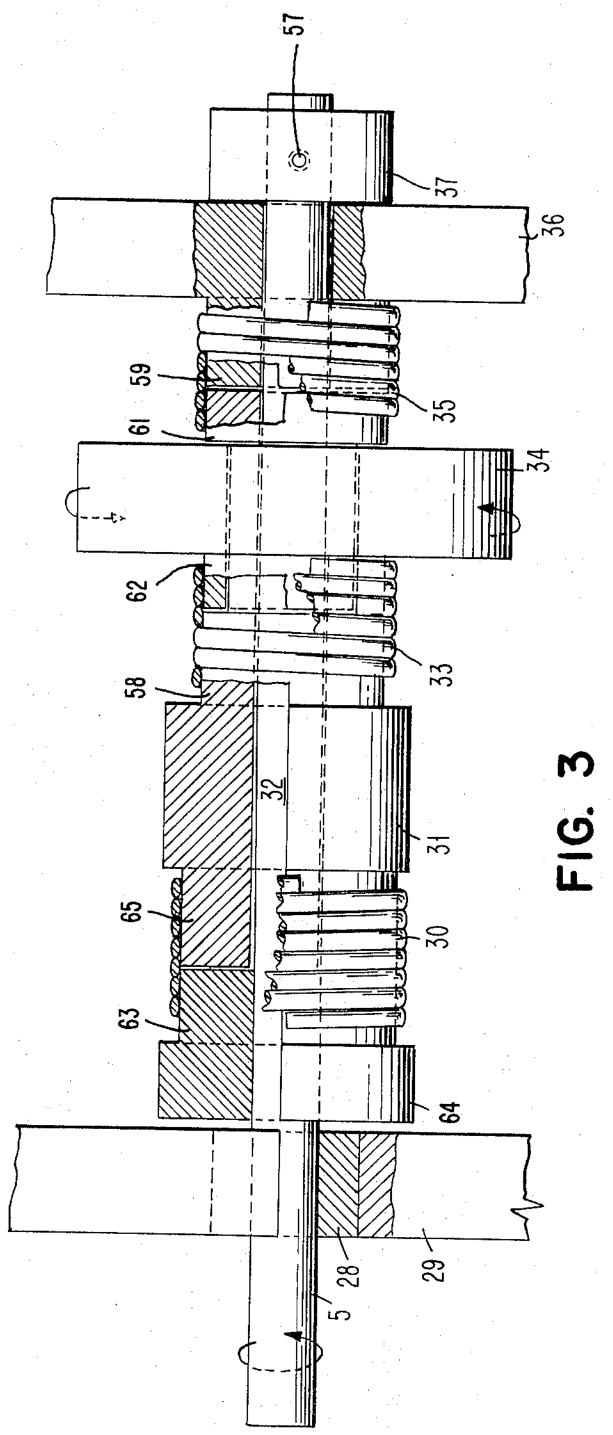
FIG. 3 is a sectional view of another embodiment of a multishaft unit illustrating the arrangement of spring clutches, apparatus frame, and output shaft.

Refer next to FIG. 3 wherein there is shown another embodiment of a multishaft unit for driving and tensioning a recording tape. This embodiment can be substituted for units 60 and 70 depicted in FIGS. 1 and 2. As shown, main shaft 32 has on one end an output (which 5 journaled in (bushing 28) and extending beyond portion 29 of the apparatus frame. On the other end is collar 37 which is secured thereto by means of set screw 57. Reference numeral 36 represents a portion of a support secured to the apparatus frame (not shown). For rotation of pulley 34 in the clockwise direction (as viewed from the right end of the unit) check clutch spring 35 will slip on arbor 61, pulley clutch spring 33 will grip arbor 62 which is integral with pulley 34, and drag clutch spring 30 will be slipping on arbor 63 9which is integral with hub 64 and main shaft 32), but supplying a drag to output 5. For rotation in the counter-clockwise direction, check clutch spring 35 will grip, pulley clutch spring 33 will slip, and output shaft 5 will be slipping against drag clutch spring 30.

FIG. 3 has been simplified for purposes of understanding. For example, spring clips for maintaining clutches 30, 33, and 35 would be used in a manner similar to that described with respect to FIG. 2. That is, one clip would secure check clutch spring 35 to arbor 59 which is integral with support 36, another clip would secure pulley clutch spring 33 to arbor 58 of secondary shaft 31, and yet another clip would secure drag clutch spring 30 to arbor 65 of secondary shaft 31.

When the multishaft unit of FIG. 3 is substituted for units 60 in FIG. 1, springs 30, 33, and 35 will respectively have right, left, and left hand turns. When substituted for unit 70, these springs will have left, right, and right hand turns. Of course, the only requirement in this respect is that the units, as far as the springs are concerned, be asymmetrical with respect to the motor or each other. That is, the arrangement shown in FIG. 3 could be substituted for unit 60 and an asymmetrical version could be substituted for unit 70.

For the embodiment shown in FIG. 2, the multiple shafts making up the unit include output shaft 4, main shaft 40, and input shaft (arbor) 53. The multiple shafts for FIG. 3 include main and output shaft 32 and 5, secondary shaft 31 and input shaft (arbor) 62.

In operation the tape has loads applied at three points; the take-up reel, the supply reel, and the capstan and associated pinch roller (not shown). The supply reel load is provided by the drag clutch and is resisting the tape motion. This resistance to the tape being pulled through the capstan and pinch roller maintains tape tension necessary for magnetic recording head contact as well as preventing tape spillage on start-ups or stops. The capstan - pinch roller load is the dominate driving force in the system and thus is the one monitered to obtain precise velocity control. It is in effect pulling tape from the supply reel against the drag clutch load. The third load applied to the tape is related to taking up the tape that is fed through the capstan - pinch roller area. This load maintains a tight tape section for the same reasons stated previously for the supply reel drag. The take-up reel drive is a permissive type drive due to the take-up reel driving diameter changing with the amount of tape on the reel.

When the direction of tape motion is reversed by changing the direction of rotation of the motor and thus the capstan rotation, only one of the three aforementioned tape loads changes direction. The capstan - pinch roller load changes direction while the torques applied to the two reels remain of the same magnitude and direction. The two reels merely have switched roles, i.e., the supply reel is now the take-up reel and vice versa.

The structural make-up of the individual spring clutches is based on several consideratons. The torque output of the drag clutch must be great enough to maintain sufficient tape tension for adequate magnetic head contact and yet not stretch the tape. Another important consideration for this clutch is that the torque output must be great enough to insure that the response of a fully loaded tape reel on start-up, or stop, is at least equivalent to the total drive response. Once the magnitude of the clutch torque is calculated, other calculations related to the individual clutch components are determined by the requirement of a smooth and constant torque output. That is, proper selection of the arbor, spring materials, and sizes provide for a smooth output.

Although a spring clutch is a friction device, and thus subject to changes due to weather conditions, oil, contamination, etc., with proper design considerations with respect to the diametral interference and the number of spring coils in contact with the arbor, this friction dependence can virtually be eliminated for realistic values of coefficient of friction. That is, for a properly designed spring clutch, although the coefficient of friction between the arbor and spring may vary significantly, the overrunning torque output of the clutch remains virtually constant. The drag clutches are always used in the overrunning or slip direction.

The structural characteristics of the check and pulley clutches are not as critical as those of the drag clutches. Only a high grip to slip torque ratio is required for motion reversing. The design objectives for both the check and pulley clutches is the same; an extremely low torque in the slip direction for minimum loading and a high torque for a positive drive in the grip direction. The grip torque of the spring clutches is a function of coefficient of friction and thus subject to change. With proper design of the clutches, the grip torque can be made several orders of magnitude greater than the drag clutch torque and thus not allow change in friction to affect the functioning of the multishaft drive units.

As an example of the above, the actual structural characteristics of the clutches for a modeled tape drive apparatus are set out in the following table.

While the invention has been particularly shown and described with reference to several embodiments, it will be understood by those skilled in the art that various changes in form and detail may be made without departing from the spirit and scope of the invention.

What is claimed is:

1. A recording tape drive apparatus comprising:

a. a first unit having 1) an input shaft, 2) an output shaft for tape reel means on and from which a tape can be alternately wound and unwound, and 3) a number of direction actuatable spring clutch means including a pulley clutch, a check clutch, and a drag clutch for connecting said input and output shafts of said first unit and providing, separately, slip, grip, and drag when said tape is driven in a first and a second direction, and arranged for effecting respectively and alternately, take-up and supply tensioning of said tape when driven in said first and second directions; and b. a second unit having 1) an input shaft, 2) an output shaft for tape reel means on and from which said tape can be alternately wound and unwound, and 3) a number of direction actuatable spring clutch means including a pulley clutch, a check clutch, and a drag clutch for connecting said input and output shafts of said second unit and providing, separately, slip, grip, and drag when said tape is driven in said first and second directions, and arranged for effecting respectively and alternately, take-up and supply tensioning of said tape when driven in said first and second directions; and c. drive means for driving said tape and said input shafts of said first and second units in said first and second directions.

2. An apparatus according to claim 1 wherein said drive means includes a capstan for driving said tape.

3. An apparatus according to claim 1 wherein said drag clutch effects tensioning on said tape when driven in said first and second directions.

* * * * *

| CLUTCH | ARBOR | | | SPRING | | | | | | CLUTCH | | |
|---|---|---|---|---|---|---|---|---|---|---|---|---|
| | Outside Diameter (inches) | Length (inches) | Material | Free[1] Inside Diameter (inches) | Number of Turns | Wire Height (inches) | Wire Width (inches) | Wire Material | Diametral Interference (inches) | Number Active Turns[2] | Slip Torque (IN.-OZ.) | Grip Torque (IN.-OZ.) |
| DRAG | .510 | .320 | Oilon* PV 80 (oil impregnated polymeric material) | .487 | 14 | .015 | .030 | Music Wire | .023 | 10 | .040 | N.A.[3] |
| PULLEY & CHECK | .500 | .240 | Oilon* PV 80 | .487 | 18 | .010 | .020 | Music Wire | .013 | 12 | .0045 | 2.403 |

[1]When not in contact with arbor
[2]In contact with arbor
[3]Not applicable since drag clutch is always operated in slip direction In summary, an apparatus is provided having two multishaft drive units with the shafts of each unit connected by spring type clutches. A motor drive shaft is connected by a belt to each multishaft unit which in turn is connected to a take-up or supply reel for magnetic recording tapes. For one of the multishaft units when the motor is driven in one direction, a check type spring clutch will grip, a pulley type spring clutch will slip, and a drag type spring clutch will slip, but supply drag to the output shaft of the unit. When the motor is rotated in the other direction, the check clutch will slip, the pulley clutch will grip, and the drag clutch will again slip, but provide a torque limited drive force to the output shaft. Each multishaft unit is comprised of a main shaft and an output shaft with the check clutch connecting the main shaft to the frame. The pulley clutch connects the take-up drive wheel to the main shaft, and the drag clutch connects the main shaft to the output shaft. With respect to the motor drive shaft each multishaft spring clutch arrangement is asymmetrical.